(12) United States Patent
Terada

(10) Patent No.: US 9,360,074 B2
(45) Date of Patent: Jun. 7, 2016

(54) WAVE SPRING AND LOAD ADJUSTING METHOD THEREFOR

(71) Applicant: NHK SPRING CO., LTD., Yokohama-shi, Kanagawa (JP)

(72) Inventor: Yusuke Terada, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 14/385,081

(22) PCT Filed: Mar. 12, 2013

(86) PCT No.: PCT/JP2013/056783
§ 371 (c)(1),
(2) Date: Sep. 12, 2014

(87) PCT Pub. No.: WO2013/137242
PCT Pub. Date: Sep. 19, 2013

(65) Prior Publication Data
US 2015/0042025 A1 Feb. 12, 2015

(30) Foreign Application Priority Data

Mar. 12, 2012 (JP) ................................. 2012-054987

(51) Int. Cl.
*F16F 1/34* (2006.01)
*F16F 1/32* (2006.01)

(52) U.S. Cl.
CPC ............. *F16F 1/328* (2013.01); *F16F 2226/00* (2013.01); *Y10T 29/49609* (2015.01)

(58) Field of Classification Search
CPC ............. F16F 1/048; F16F 1/34; F16F 1/328; F16F 2234/00; F16F 2234/06
USPC .................. 267/161, 162, 164, 180
See application file for complete search history.

(56) References Cited

U.S. PATENT DOCUMENTS

| | | | |
|---|---|---|---|
| 1,512,362 A * | 10/1924 | Phelps ........................... | 267/161 |
| 5,622,358 A | 4/1997 | Komura et al. | |
| 5,803,444 A * | 9/1998 | Shibuya et al. ............... | 267/180 |
| 2005/0093216 A1* | 5/2005 | Kobelev et al. ............... | 267/161 |
| 2012/0128490 A1* | 5/2012 | Boston et al. .................. | 416/135 |

FOREIGN PATENT DOCUMENTS

| | | |
|---|---|---|
| JP | A-6-280912 | 10/1994 |
| JP | Y2-2586112 | 12/1998 |
| JP | A-2005-248983 | 9/2005 |
| JP | A-2005-282807 | 10/2005 |
| JP | A-2009-257491 | 11/2009 |
| WO | WO 2005/083292 A1 | 9/2005 |

OTHER PUBLICATIONS

International Preliminary Report on Patentability issued in International Application No. PCT/JP2013/056783 mailed on Jun. 27, 2014 (with translation).
International Search Report issued in International Application No. PCT/JP2013/056783 dated Jun. 11, 2013.

* cited by examiner

*Primary Examiner* — Thomas J Williams
(74) *Attorney, Agent, or Firm* — Oliff PLC

(57) ABSTRACT

The present invention provides a wave spring and a load adjusting method therefor in which a ratio of a spring constant can be freely adjusted. In a wave spring, a high mountain portion and a low mountain portion form a combination, and the combination is repeatedly formed along a circumferential direction. A valley portion is formed between the mountain portions. Since distance between mountain portions is constant in the conventional design of wave springs, the ratios of spring constant are only specific values (plot indicated by ○). In contrast, in the design of the wave spring, since the pitch angle A of the high mountain portion and the pitch angle B of the low mountain portion can be changed in the combination, the ratio can be freely adjusted.

6 Claims, 3 Drawing Sheets

WAVE SPRING AND LOAD ADJUSTING METHOD THEREFOR

TECHNICAL FIELD

The present invention relates to a ring-shaped wave spring having a high-mountain portion and a low-mountain portion, and relates to a load adjusting method therefor, and specifically relates to a method of designing a wave spring.

BACKGROUND ART

Wave springs have been used in various ways, for example, as a damper for buffering impact in clutch engagement of a clutch mechanism, and the like. The wave spring is a ring-shaped (annular) spring having plural mountain portions.

Wave springs have mountain portions comprising high mountain portions and low mountain portions, whereby the spring constant thereof is changed at a process of the stroke when a load is applied. Specifically, a wave spring may be disposed between a first member and a second member. In this case, the top portion of the high mountain portion is contacted with the first member, and a valley portion is contacted with the second member. When a load is applied to the first member toward the second member, the spring is elastically deformed such that the height of the high mountain portion is decreased. When only the high mountain portion is contacted with the first member, for example, as shown in FIG. 5, a linear characteristic with the spring constant K1 is shown. When the low mountain portion is also contacted with the first member at a process of elastic deformation of the spring, the high and low mountain portions are contacted with the first member, whereby a linear characteristic with the spring constant K2 which is larger than the spring constant K1 is shown.

Such a wave spring is disclosed in, for example, Patent Publications 1 and 2. In the wave spring disclosed in Patent Publication 1, a combination of a high mountain portion and a low mountain portion is repeated at an equal interval. In a wave spring disclosed in Patent Publication 2, a combination of plural mountain portions (a high mountain portion and plural low mountain portions) and a valley portion is repeated at an equal interval, and the low mountain portions are formed with an equal interval in combination.

Patent Publication 1 is Japanese Unexamined Patent Application Publication No. 2005-282807.

Patent Publication 2 is Japanese Utility Model Publication No. 2586112.

DISCLOSURE OF THE INVENTION

Problems Solved by the Invention

As mentioned above, in a wave spring, high mountain portions and low mountain portions are formed as mountain portions, the spring constant K1 can be changed to spring constant K2 at a process of a stroke. However, the ratio (K1/K2) of the spring constant cannot be freely adjusted by a conventional design method.

Specifically, when the ratio of number of high mountain portions with respect to number of low mountain portions is changed, the spring constants K1 and K2 cannot be continuously changed. FIG. 6 is a graph showing load characteristics of a wave spring consisting of three high mountain portions and three low mountain portions and a wave spring consisting of two high mountain portions and four low mountain portions. As shown in FIG. 6, when total number of the high mountain portions and the low mountain portions is 6, even if proportion of number of the high mountain portions and number of the low mountain portions is changed, the spring constant cannot be changed within the region indicated by the number Q, and the ratio (K1/K2) of the spring constant cannot be freely adjusted.

Therefore, it may be proposed to adjust the load by changing inner and outer diameters and a thickness of a wave spring. However, since space for a wave spring is generally decided at the time of design, these parameters cannot be changed virtually. As a result, the ratio (K1/K2) of the spring constant cannot be freely adjusted.

Therefore, an object is to provide a wave spring and load adjusting method therefor in which the ratio (K1/K2) of the spring constant can be freely adjusted.

Means for Solving the Problems

The present invention provides a load adjusting method for a wave spring, comprising: repeatedly forming a combination including plural kinds of mountain portions having different heights from each other; wherein in design of the combination, the number of the combinations is decided, and a pitch angle of the plural kinds of mountain portions is changed, and a valley portion is formed between the plural kinds of mountain portions, and at least one of the valley portions is formed with a flat portion which lies in the same plane with the valley portion, whereby load is adjusted.

According to the load adjusting method for a wave spring of the present invention, a combination including plural kinds of mountain portions having different heights from each other is repeatedly formed, whereby spring constants of which the number corresponds to the number of the kinds of the mountain portions are shown in the load characteristics of the wave spring. Specifically, when a combination includes N kinds of mountain portions having different heights from each other, spring constants K1, K2, . . . , KN (N is a natural number) are shown in the load characteristics of the wave spring.

In design of the combination, the ratio (Kn−1/Kn, wherein n is a natural number not less than 2) of a spring constant can be freely adjusted by changing each of the pitch angles of the N kinds of mountain portions in a combination. Therefore, the ratio of spring constant can be adjusted without change of parameters such as inner and outer diameter and a thickness of a wave spring, and the wave spring can be used in the space that has been designed for the wave spring.

In the load adjusting method for a wave spring of the present invention, a valley portion is formed between the plural kinds of mountain portions, and at least one of the valley portions is formed with a flat portion which lies in the same plane with the valley portion, whereby load is adjusted. In this embodiment, the pitch angle of the flat portion formed in the valley portion is changed, whereby the same effects as the effects obtained by changing the pitch angle of the N kinds of mountain portions, and since flexibility of design can be greatly improved, the required spring constant can be accurately adjusted.

The present invention provides a wave spring comprising: repeatedly formed combinations including plural kinds of mountain portions having different heights from each other; wherein pitch angles of the plural kinds of mountain portions in the combination are different from each other, and a valley portion is formed between the plural kinds of mountain portions, and at least one of the valley portions is formed with a flat portion which lies in the same plane with the valley portion. The wave spring of the present invention can obtain the same effects as the load adjusting method for a wave spring of the present invention.

According to the wave spring and the load adjusting method therefor, the ratio of spring constant can be adjusted without change of parameters such as inner and outer diameters and a thickness of a wave spring.

BEST MODE FOR CARRYING OUT THE INVENTION

Figure 1A:
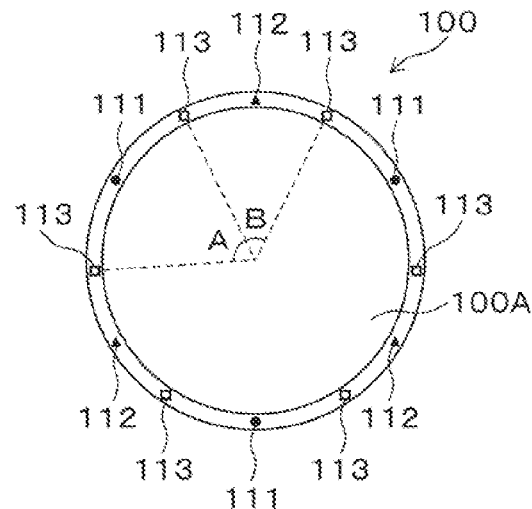
FIG. 1A is a schematic top plane view showing positions of mountain portions and valley portions of a wave spring of an embodiment and FIG. 1B is a development view of the wave spring developed along the circumferential direction.
Figure 1B:
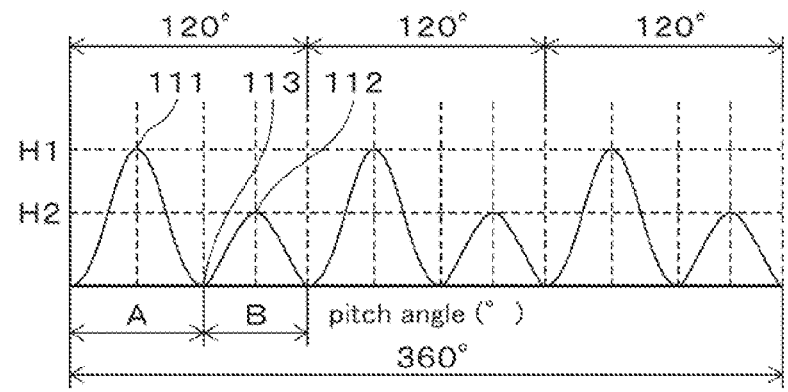
Figure 2:
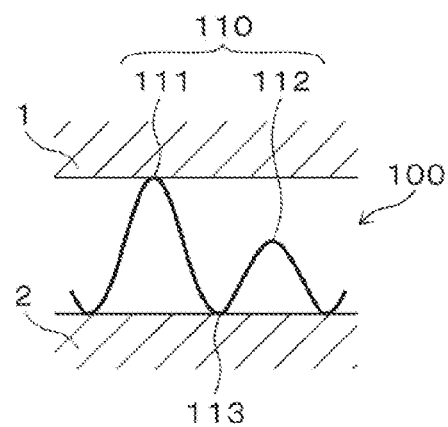
FIG. 2 shows a portion of a wave spring of the embodiment that is disposed between members.

An embodiment of the present invention will be explained hereinafter with reference to the drawings. FIGS. 1A and 1B are drawings showing a structure of a wave spring of the embodiment of the present invention. FIG. 2 shows a portion of the wave spring shown in FIGS. 1A and 1B, which is disposed between members. As shown in FIG. 1A, the wave spring 100 has, for example, a ring-shape having a hole portion 100A, and has high mountain portions 111 and low mountain portions 112. The height H1 of the high-mountain portion 111 is set higher than the height H2 of the low mountain portion 112. In FIG. 1A, the symbols ●, ▲, and □ indicate the top portion of the high mountain portion 111, the top portion of the low mountain portion 112, and the bottom portion of the valley portion 113 respectively.

In the wave spring 100, the high mountain portion 111 and the low mountain portion form a combination 110, and the combination is repeatedly formed along the circumferential direction. A valley portion 113 is formed between the high-mountain portion 111 and the low-mountain portion 112. The high-mountain portion 111 and the low-mountain portion 112 are bilaterally symmetric with respect to the top portion of each mountain portion.

When the number of the combination 110 is defined as M, the pitch angle of the high-mountain portion 111 is defined as A (°), and the pitch angle of the low-mountain portion 112 is defined as B (°), B is determined by the following formula (1).

$$B=(360/M)-A \quad (1)$$

In the embodiment, since the number M of the combination 110 is, for example, 3, B is designated as the following formula (2). In the example shown in FIG. 1, the pitch angles A and B are set different from each other, and for example, A is set as 67.5 (°) and B is set as 52.5 (°).

$$B=120-A \quad (2)$$

Figure 5:
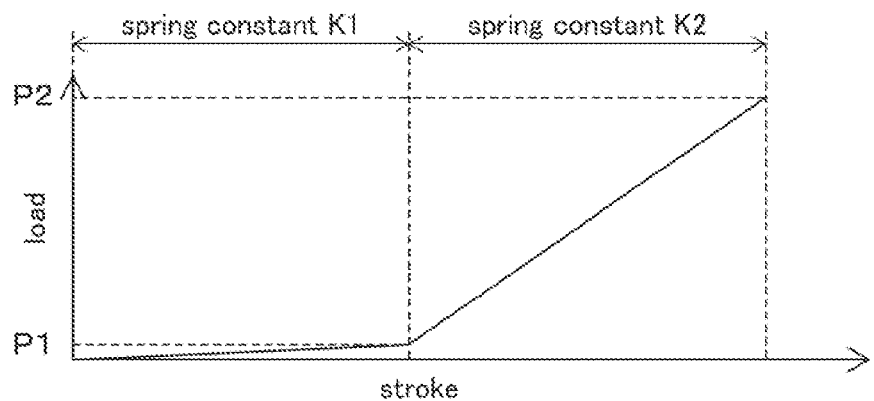
FIG. 5 is a graph showing load characteristics of the wave spring.
Figure 6:
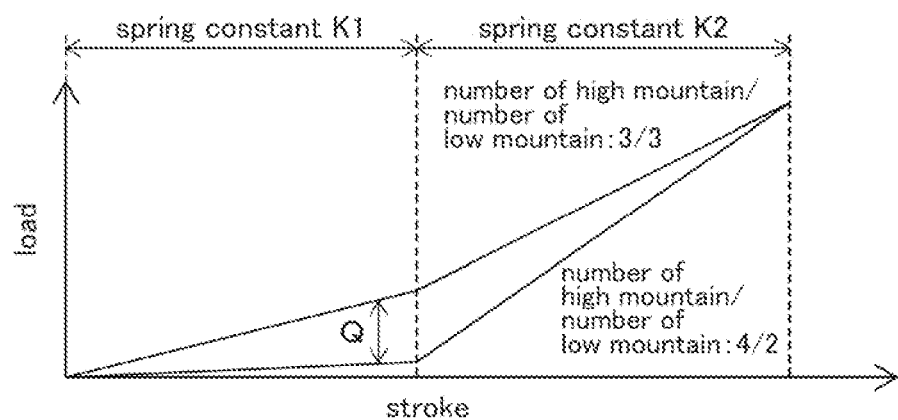
FIG. 6 is a graph showing load characteristics in a conventional wave spring in which the proportion of number of high mountain portions and low mountain portions is changed whereas the total number of mountain portions is constant.

For example, as shown in FIG. 2, when the wave spring 100 is disposed between a first member 1 and a second member 2, the top portion of the high-mountain portion 111 is contacted with the first member 1 and the valley portion 113 is contacted with the second member 112. When a downward load is applied to the first member 1, the wave spring 100 is elastically deformed such that the height of the high-mountain portion 111 is lowered. In this case, when only the top portion of the high-mountain portion 111 contacts the first member 1, the spring constant K1 exhibits linear characteristics, for example, as shown in FIG. 5. When the top portions of the high mountain portion 111 and the low mountain portion 112 contact the first member 1, the spring constant K2, which is larger than the spring contact K1, exhibits linear characteristics, for example, as shown in FIG. 5.

The load characteristics of the wave spring 100 were explained with reference to FIG. 5 as in the conventional technique. In the embodiment, the spring constant K1 in the first step and the spring constant K2 in the second step can be adjusted as well as by changing the proportion of number of the high mountain portions and number of the low mountain portions, and changing the pitch angle A of the high mountain portion and the pitch angle B of the low mountain portion as follows.

An example of a production method including a load adjusting method for a wave spring 100 will be explained hereinafter. A blank having a center hole is punched from a plate material having a predetermined thickness by, for example, press working. Then, the blank is formed to have a corrugated shape. In the corrugated shape of the blank, a combination of a high mountain portion and a low mountain portion is repeatedly formed along the circumferential direction. Then, the blank having the corrugated shape is subjected to a heat treatment (quenching and annealing). Thus, a wave spring 100 in which the combination 110 of the high mountain portion 111 and the low mountain portion 112 is repeatedly formed along the circumferential direction is obtained. The formation of the corrugated shape and the heat treatment of the blank can be simultaneously performed. Several arrangements can be used in the production method for the wave spring 100, and known production methods can be applied within the scope of the invention.

In a design process of the combination 110 of the embodiment, the pitch angle A of the high mountain portion 111 and the pitch angle B of the low mountain portion 112 are changed in one combination 110, whereby the ratio (K1/K2) of the spring constant can be freely adjusted. Therefore, the spring constant K1 in the first step and the spring constant K2 in the second step can be adjusted.

Figure 3:
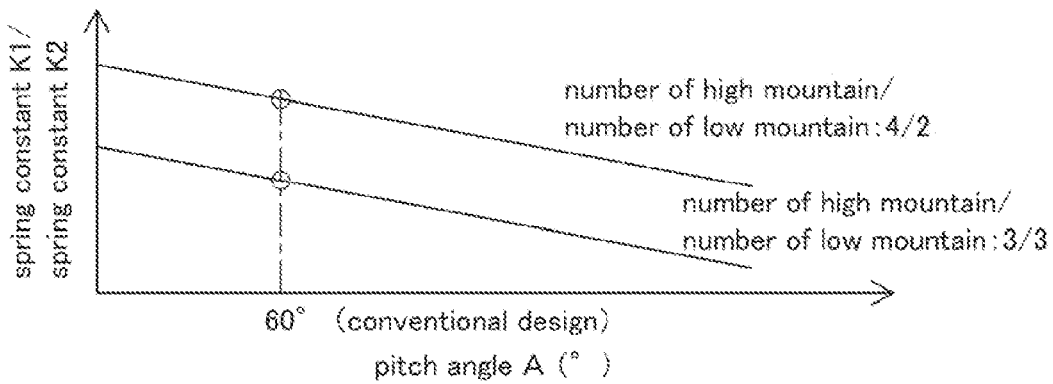
FIG. 3 is a graph showing a relationship between a pitch angle and a ratio of spring constant in a high mountain portion in the wave spring of the embodiment.

Specifically, in a load characteristic on a wave spring in which a combination consisting of two kinds of mountain portions (a high mountain portion and low mountain portion) having different heights is repeatedly formed, and the spring constants K1 and K2 are shown in FIG. 5. In a conventional wave spring, when the total number of the high mountain portions and the low mountain portions is six (that is, when the number of the combination is three and the pitch angle of one combination is 120°, since distances between mountain portions are constant, the pitch angle between the high mountain portion and the low mountain portion must be 60°. Therefore, even if the proportion of number of the high mountain portions and number of the low mountain portions is changed, a spring constant within the region indicated by the reference number Q cannot be obtained. For example, in a case in which four high mountain portions and two low mountain portions are formed, and in a case in which three high mountain portions and three low mountain portions are formed, the ratios (K1/K2) of spring constant are only specific values (plot indicated by ○) as shown in FIG. 3.

In contrast, in the embodiment, for example, in a case in which four high mountain portions and two low mountain portions are formed, and in a case in which three high mountain portions and three low mountain portions are formed, the pitch angle A can be changed. For example, as shown in FIG. 3, as the pitch angle A is increased, the ratio (K1/K2) of the spring constant linearly decreases. Thus, the ratio (K1/K2) of the spring constant can be contiguously changed by changing the pitch angle A of the high mountain portion 111 and the pitch angle B of the low mountain portion 112.

Therefore, the ratio (K1/K2) of the spring constant can be adjusted without changing the parameters such as the inner and outer diameters and the thickness of the wave spring 100, whereby the wave spring 100 can be disposed in the predetermined space.

Figure 4:
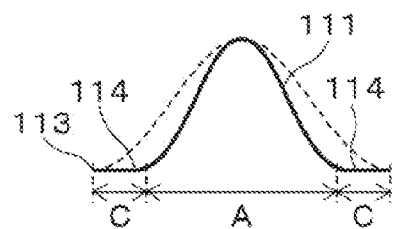
FIG. 4 shows a portion of a variation of a wave spring in which a flat portion is formed in a valley portion.

The present invention has been explained by way of the above embodiment, but the present invention is not limited to the embodiment, and a number of arrangements are possible. For example, as shown in FIG. 4, the valley portion 113 adjacent to the high mountain portion 111 is formed with a flat portion 114, thereby changing the pitch angle A° of the high mountain portion 111. When the flat portion 114 is not formed, the shape of the high mountain portion 111 is shown by the broken line in FIG. 4. FIG. 4 shows an example in which the pitch angle A of the high mountain portion 111 is changed by forming the flat portion 114, the pitch angle B of the low mountain portion 112 may be changed by forming the flat portion 114.

In the above embodiment, the pitch angle of the flat portion 114 formed in the valley portion 113 is changed, whereby the same effects as the effects obtained by changing the pitch angles of the mountain portions 111 and 112 are obtained.

In the embodiment in which the flat portion 114 is not formed, but the pitch angles A and B of the high mountain portion 111 and the low mountain portion 112 are changed, as shown in the formula (1), the pitch angles A and B affect each other so that, for example, when the pitch angle A is increased, the pitch angle B is decreased, so that the pitch angles A and B cannot be changed separately.

In contrast, in the above embodiment, for example, the flat portion 114 is formed in the valley portion 113, which is adjacent to the high-mountain portion 111, whereby only the pitch angle A can be adjusted, and the spring constant of the high mountain portion 111 can be separately adjusted. For example, the flat portion 114 is formed in the valley portion 113, which is adjacent to the low mountain portion 112, whereby only the pitch angle B can be adjusted, and the spring constant of the low mountain portion 112 can be separately adjusted. Flat portion 114 may be formed in the valley portion 113, which is adjacent to the high mountain portion 111 or the low mountain portion 112, whereby each spring constant of each mountain portion can be separately adjusted. Therefore, flexibility of design can be greatly improved, and a required spring constant can be accurately adjusted compared to the embodiment in which the flat portion 114 is not formed.

In the above embodiment, a combination comprising two kinds of mountains 111 and 112 having different heights are repeatedly formed, but the invention is not limited to this embodiment, and a combination comprising three kinds of mountains of different heights may be repeatedly formed.

100 wave spring
110 combination
111 high mountain portion
112 low mountain portion
113 valley portion
114 flat portion
1 first member
2 second member
A pitch angle of high mountain portion
B pitch angle of low mountain portion
C pitch angle of flat portion

The invention claimed is:

1. A load adjusting method for a wave spring, comprising:
repeatedly forming a combination including plural kinds of mountain portions having different heights from each other;
wherein in the design of each combination, the total number of the combinations forming the wave spring is decided, pitch angles of the plural kinds of mountain portions forming each combination are established, and a valley portion is established between adjacent ones of the plural kinds of mountain portions, wherein a flat portion is formed in at least one of the valley portions of the wave spring, the flat portion has a predetermined pitch angle and lies in the same plane with the valley portion, whereby load is adjusted,
wherein the flat portion is connected to a foot of one of the mountain portions such that the flat portion is on a tangent line of the foot.

2. The load adjusting method for a wave spring according to claim 1, wherein the plural kinds of mountain portions for at least one combination includes a high-mountain portion and a low-mountain portion, and the flat portion is adjacent to the high-mountain portion.

3. A wave spring comprising:
repeatedly formed combinations including plural kinds of mountain portions having different heights from each other;
wherein in each combination, pitch angles of the plural kinds of mountain portions are different from each other and a valley portion is established between adjacent ones of the plural kinds of mountain portions, wherein a flat portion is formed in at least one of the valley portions of the wave spring, the flat portion has a predetermined pitch angle and lies in the same plane with the valley portion,
wherein the flat portion is connected to a foot of one of the mountain portions such that the flat portion is on a tangent line of the foot.

4. The wave spring according to claim 3, wherein the plural kinds of mountain portions for at least one combination includes a high-mountain portion and a low-mountain portion, and the flat portion is adjacent to the high-mountain portion.

5. A load adjusting method for a wave spring, comprising:
repeatedly forming a combination including plural kinds of mountain portions having different heights from each other;
wherein in the design of each combination, the total number of the combinations forming the wave spring is decided, pitch angles of the plural kinds of mountain portions forming each combination are established, and a valley portion is formed between adjacent ones of the plural kinds of mountain portions, wherein a flat portion having a predetermined angle is formed in at least one of the valley portions of the wave spring, whereby the pitch angle of one of the plural kinds of mountain portions adjacent to the flat portion is reduced from the established pitch angle.

6. The load adjusting method for a wave spring according to claim 5, wherein the flat portion lies in the same plane with the valley portion.

* * * * *